Dec. 24, 1963  L. H. WALKER  3,115,176
METHOD OF PEELING EDIBLE PLANT PRODUCTS
Filed May 18, 1961
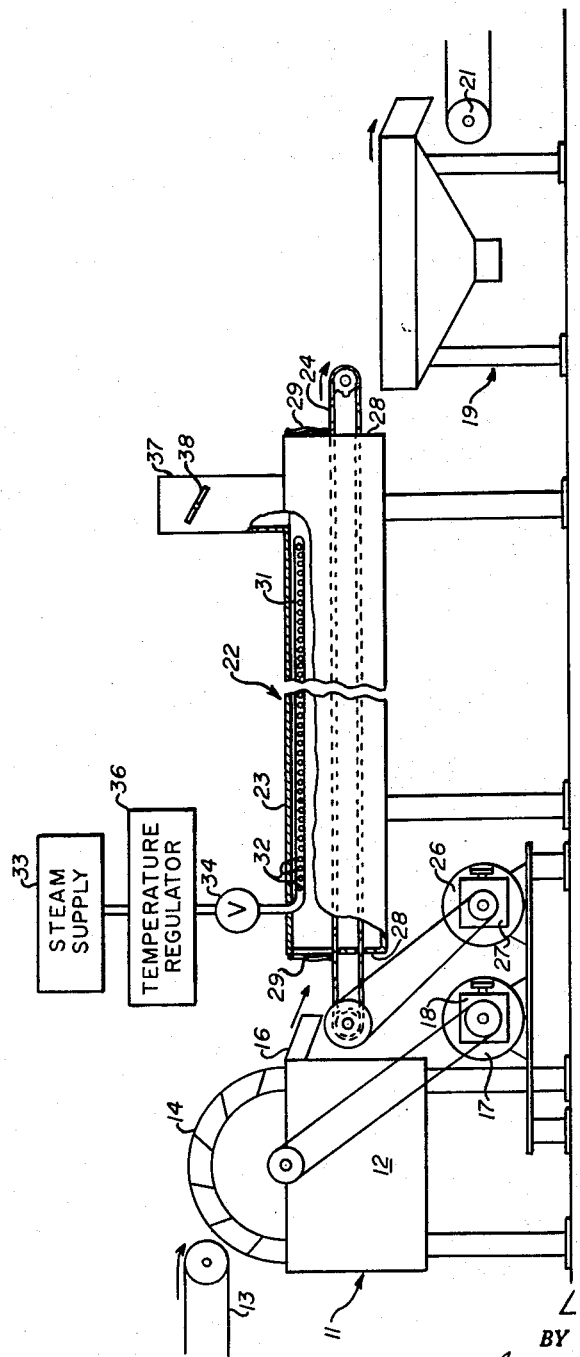
INVENTOR.
LEANDER H. WALKER
BY
Gardner + Zimmerman
ATTORNEYS

United States Patent Office 3,115,176
Patented Dec. 24, 1963

3,115,176
METHOD OF PEELING EDIBLE PLANT
PRODUCTS
Leander H. Walker, 23 The Crescent, Berkeley, Calif.
Filed May 18, 1961, Ser. No. 110,950
5 Claims. (Cl. 146—235)

The present invention relates to food processing and more particularly to a method and apparatus for removing the skins from comestible plant produce. For purposes of example the invention will be herein described with reference to the peeling of potatoes, it being understood that the invention is equally applicable to the treatment of other edible plant products such as apricots, carrots, onions and the like.

In food processing operations, a common technique for peeling large quantities of potatoes involves the immersion of the potatoes in a caustic solution to loosen and chemically disintegrate the skins. Subsequently the potatoes are conveyed to a washing apparatus where the caustic is rinsed away and any remaining loose pieces of skin are removed. This process, commonly known as lye peeling, is usually carried out by means of motor driven machinery.

As heretofore practiced, the lye peeling process results in an undue loss of potato flesh. In a typical commercial operation losses of from sixteen to twenty-five percent of the initial weight of the potatoes may occur. This wastage, in the conventional process, results largely from the fact that the attack of the caustic cannot be controlled with sufficient precision to limit the chemical acion to the skin of the potato.

After a short period of immersion in the hot lye, some potato skins in a lot being processed tend to split open thereby exposing portions of the underlying flesh. As the flesh is much less resistant than the skin, erosion of the former proceeds very rapidly. Channels of destroyed flesh, which may be as much as three-sixteenth of an inch deep, are formed before the action of the lye on the skin has been completed. In other potatoes skin is totally dissolved and sufficient lye attack on flesh occurs to reduce the diameter of a potato by as much as one-half inch.

In addition to the foregoing effect, further losses result from the fact that the skins of individual potatoes vary considerably in resistance to lye attack. A set of operating conditions, i.e., temperature, solution strength and immersion time, suitable for removing the tougher skins will cause over peeling and considerable destruction of the flesh on the less resistant potatoes.

For the reason discussed above, only a very coarse control of the process can be obtained by following by conventional practice of regulating the immersion time of the potatoes in the lye solution. Thus for maximum economy and efficiency, new control techniques are needed to limit the chemical action solely to the potato skins.

The present invention provides for limiting the depth to which the caustic can attack the potatoes by removing the potatoes from the solution well prior to complete disintegration of the skins. Upon removal from the solution, the potatoes retain a thin coating of lye solution and the remaining chemical action is confined to that which can be effected by this coating. The coating is used up in completing disintegration of the skins and thus appreciable erosion of the flesh does not occur.

While the foregoing procedure limits the amount of erosion of the flesh which can occur, still additional techniques are needed for fine control of the depth of attack of the caustic coating on the potato. This is accomplished by providing a holding zone for receiving the potatoes immediately following removal from the lye solution. By providing adjustable means for regulating the temperature, humidity and transit time within the holding zone, an operator may tune the holding zone to meet the exact peeling requirements of each individual lot of potatoes to be processed. In this manner the caustic may be limited to acting only on the skins of the potatoes. By means of the invention, the regulating of the immersion time of the potatoes in the solution becomes merely a coarse control used only to compensate for gross differences in lye resistivity between batches of potatoes.

Since the potatoes pass through the peeler more rapidly than in the conventional process, the invention has the further advantage of considerably increasing the output of a peeler of given size.

It is therefore an object of this invention to provide a more economical and efficient method and apparatus for peeling edible plant produce.

It is another object of this invention to provide for a more precise control of the chemical attack where caustic solutions are used to peel vegetables and fruits.

It is another object of the invention to provide a method and means for limiting the action of a lye solution substantially to the skin of potatoes and other produce.

It is still another object of this invention to utilize the controlling effects of the regulation of air temperature and humidity on the rate of chemical reaction in a lye peeling process.

It is a further object of the invention to substantially reduce the losses of edible flesh in the peeling of edible plant products by the action of a caustic thereon.

It is a further object of the invention to provide an improved method and apparatus for peeling plant products which is adaptable to existing peeler installations and which considerably increases the output thereof.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims. The drawing is a generally schematic view of apparatus for carrying out the process of the invention.

The invention is readily adaptable to use with existing commercial peeling equipment. Typically such an installation will include a lye peeler 11 having a tank 12 for containing the lye solution and having provision for maintaining the solution at a preferred temperature. Unpeeled potatoes are delivered to the tank 12 by any suitable delivery means such as a conveyer belt 13 and a vaned rotating wheel 14 is journalled within the tank to carry the potatoes down into the solution and across the tank to a delivery chute 16. To provide for regulation of the immersion time of the potatoes, the wheel 14 is driven by a variable speed drive means such as a motor 17 having an adjustable speed reduction mechanism 18.

In the conventional practice, potatoes from the peeler 11 are delivered directly to a washer unit 19 wherein the lye solution and remaining pieces of skin are rinsed away. The peeled potatoes are then removed by any suitable delivery means such as a conveyer belt 21. Using the techniques of the present invention, however, the washer 19 is removed from the immediate vicinity of the peeler 11 and a holding zone apparatus 22 is disposed therebetween.

The holding zone 22 functions to provide a controlled environment within which the terminal portion of the attack of the lye solution on the potatoes may be carried out. Variables which are controlled in the holding zone include air temperature, humidity, reaction time, and the rate of air flow past the potatoes. By making an appropriate adjustment of these conditions in the holding zone, the action of the lye may be confined substantially to the skins of the potatoes irrespective of variations in the resistivity of differing batches thereof.

To provide for the foregoing operations, the holding zone apparatus 22 may be comprised of a long horizontally disposed open-ended hood 23 of rectangular cross section. In an installation of typical size, the hood 23 may be of the order of fifteen feet long, one foot high and three feet broad, considerable variation in these dimensions being permissible for installations of different capacity. A conveyer belt 24 extends through the hood 23 to carry the potatoes therethrough, the forward end of the belt 24 being positioned to receive potatoes from delivery chute 16 of the peeler 11 and the outlet end of the belt being positioned to deliver the potatoes to washer 19.

In order that the transit time of the potatoes through the holding zone may be adjusted, the conveyer 24 is driven by a motor 26 having an adjustable speed reducing mechanism 27.

To facilitate the control of air conditions within hood 23, each end thereof is partially closed by suitable barriers 28 which have openings through which belt 24 extends. To allow the potatoes to be carried through the end barriers, the upper portions thereof are formed by flexible curtains 29 which yield to allow the potatoes to enter and leave the hood. The barriers 28 are constructed to allow some air to enter hood 23 to establish a humid air flow as will hereinafter be described in greater detail.

As a convenient means for regulating both the temperature and humidity within the holding zone, a steam injection pipe 31 is transpierced through the upper wall of hood 23 and extends substantially throughout the length of the hood above belt 24. Pipe 31 is provided with a large number of steam ejection perforations 32 distributed along its length within hood 23 and is connected with a steam supply 33 through a control valve 34 and means 36 for adjusting the temperature of the steam delivered to the pipe 31. In larger units pipe 31 is preferably replaced by several individual injection units in order to obtain the necessary degree of control over the length of holding zone 22.

The flow of air through hood 23 is established by providing for a thermal draft therein. For this purpose a vent stack 37 is formed on the upper surface of the hood near the output end thereof, the stack being proportioned to provide the maximum draft desired and having an adjustable damper 38 whereby the draft may be controllably reduced to meet varying conditions. Thus, owing to the tendency of the steam heated air within hood 23 to rise, air flows into the ends of the hood, along the length of the hood and out through the vent 37.

The foregoing structure thus provides a means for controlling several of the reaction conditions of the lye peeling process. The conventional control by regulating the immersion time of the potatoes in the peeler 11 is retained in that such control may be effected by the peeler motor speed reduction mechanism 18, however, such control need only be used to effect gross changes in the process. A much more precise control is effected by adjustment of the temperature, humidity and holding time within the holding zone 22.

In accordance with the invention, the immersion time of the potatoes in the peeler 11 may be reduced to the relatively short period in which sufficient caustic is picked up to bring about the destruction of the skins during the subsequent passage of the potatoes through the holding zone. The immersion time may therefore be only a small fraction of the conventional value. In addition to preventing any significant destruction of potato flesh in the peeler, the shortened immersion time allows potatoes to be processed at a greater rate and lessens the contamination of the lye solution by detached potato skins.

Following the brief immersion in the lye solution, the potatoes are passed to the holding zone where the attack of the solution on the potato skins is completed under carefully controlled conditions.

Each potato enters the holding zone with only a thin coating of the lye solution. The depth to which this limited amount of caustic can attack the potato surface is a function of the time, temperature, humidity and air flow rate within the holding zone and accordingly these variables are adjusted until it is observed that the action of the caustic is being restricted substantially to just the skins of the potatoes.

Using apparatus as herein described, for example, adjustable speed reducing mechanism 27 may be used to regulate the time potatoes remain in the holding zone, the steam temperature regulator 36 provides a means for adjusting the temperature within the holding zone, valve 34 may be used to vary the humidity and the air flow rate is controllable by means of the damper 38.

The optimum time, temperature, humidity and air flow for any particular run are dependent upon such factors as the characteristics of the batch of potatoes, the immersion time in the peeler, the lye solution strength and the transit time of the potatoes through the holding zone. Thus the exact adjustments are best made empirically by observing the condition of the potatoes at the output of the holding zone and then making an appropriate adjustment in one or more of the variables.

After passage through the holding zone, the potatoes are washed in the conventional manner, in the washer 19, for example, to rinse away any remaining caustic and to remove any pieces of peeling which may be adhering to the potatoes. The potatoes emerge from the washing step peeled and clean in condition for subsequent processing.

The following example illustrates the usage of the invention in a commercial potato processing line:

The invention was applied to an existing commercial installation which had a rotary peeler with a capacity of approximately six tons of potatoes per hour when operated in the conventional manner. Conventional operating data were a nine minute immersion time in the peeler, a lye solution strength of 20% and a solution temperature of 140° F. Treated potatoes were discharged from the peeler into a conventional brush washer. Yields, under conventional operating conditions, averaged 78% to 82% of the entering weight of raw potatoes.

A holding zone, designed as hereinbefore described, was inserted between the peeler and washer. Operations were carried out in such a manner that potatoes discharged from te peeler were distributed in a single layer on the belt of the holding zone, passed through the zone, and were delivered to the brush washer. With the same values for lye temperature and solution strength, immersion time in the peeler was reduced to three and one fourth minutes. Time in the holding zone averaged six minutes with the air flow therein at 140° F. and 85% relative humidity. Operating results were a yield of 91.5% to 92.5% of the weight of entering raw potatoes and an increase in the capacity of the installation to values exceeding twelve tons per hour.

Comparable increases in yield and capacity were obtained when the invention was applied to a conventional high temperature peeling process wherein the potatoes are immersed for approximately 2.5 to 3 minutes in lye at 214 to 216° F.

Unique advantages of the invention were discovered during the above-described operations. Exceptionally fast peeling potato varieties such as the White Rose could be handled with ease through sharp reduction of the time in the peler together with suitable adjustment of the holding zone controls. Further, it was observed that the action of the lye solution in the holding zone differed from that in a peeler in that the solution tended to eat around the eyes in the potatoes thereby loosening them sufficiently that many were subsequently removed by the action of the brush washer. This result considerably reduces both labor costs and potato losses in the subsequent trimming operation by eliminating the need for manual removal of the eyes.

What is claimed is:

1. In a process for removing the skins of an edible plant product, the steps comprising contacting said product with an alkaline caustic solution for a time period sufficient to partially disintegrate but not penetrate said skins thereby to apply a residual coat of said solution to said product, then contacting said coated product with air in admixture with sufficient water vapor to provide a relative humidity of the order of 85% and at a temperature to promote the action of said residual solution coat to complete disintegration of said skin, and washing said product to remove residual solution and disintegrated skin material from said product.

2. The process as defined in claim 1 wherein said alkaline caustic solution is lye solution.

3. The process as defined in claim 1 wherein said caustic solution is a lye solution maintained at a temperature in the range of about 140° to 216° F.

4. In a process for removing skins from an edible product such as potatoes, the steps comprising contacting said product with an aqueous caustic alkaline solution at a temperature in the range of about 140° to 216° for a time period sufficient to partially disintegrate but not penetrate said skins thereby to apply a residual coat of said solution to said product, then contacting said coated product with air in admixture with water vapor at a temperature in the range of above about 140° F. but below the boiling point of water and a relative humidity of about 85% with said temperature and the water vapor content of said mixture being regulated to complete disintegration of said skin during the period of contact, and washing said product to remove residual solution and disintegrated skin material from said product.

5. The process as defined in claim 4 wherein the time of contact with said solution is in the range of about 2.5 to 9 minutes and said caustic solution is a lye solution of about 20% concentration.

References Cited in the file of this patent
UNITED STATES PATENTS

| | | |
|---|---|---|
| 2,676,632 | Hook et al. | Apr. 27, 1954 |
| 2,847,334 | Kilburn et al. | Aug. 12, 1958 |
| 2,910,393 | Magnuson et al. | Oct. 27, 1959 |
| 2,936,012 | Magnuson et al. | May 10, 1960 |
| 3,017,298 | Wilson et al. | Jan. 16, 1962 |